United States Patent
Miyoshi et al.

(10) Patent No.: US 7,512,657 B2
(45) Date of Patent: Mar. 31, 2009

(54) MESSAGE TRANSMISSION AND RECEPTION CONTROLLING SYSTEM

(75) Inventors: Osamu Miyoshi, Higashikunime (JP); Eiichiro Shioda, Tokyo (JP)

(73) Assignee: Oregadare Inc. (JP)

( * ) Notice: Subject to any disclaimer, the term of this patent is extended or adjusted under 35 U.S.C. 154(b) by 517 days.

(21) Appl. No.: 10/311,987

(22) PCT Filed: Jun. 27, 2001

(86) PCT No.: PCT/JP01/05497

§ 371 (c)(1), (2), (4) Date: Dec. 19, 2002

(87) PCT Pub. No.: WO02/01372

PCT Pub. Date: Jan. 3, 2002

(65) Prior Publication Data

US 2003/0093664 A1     May 15, 2003

(30) Foreign Application Priority Data

Jun. 28, 2000 (JP) ............................. 2000-194441
Jun. 20, 2001 (JP) ............................. 2001-185853

(51) Int. Cl.
*G06F 15/16* (2006.01)
(52) U.S. Cl. ..................................................... 709/206
(58) Field of Classification Search ......... 709/206–207, 709/229; 713/171; 380/277
See application file for complete search history.

(56) References Cited

U.S. PATENT DOCUMENTS

| 6,314,454 B1 * | 11/2001 | Wang et al. ................. 709/206 |
| 6,751,670 B1 * | 6/2004 | Patterson ..................... 709/229 |
| 6,807,277 B1 * | 10/2004 | Doonan et al. .............. 380/281 |
| 6,854,007 B1 * | 2/2005 | Hammond .................... 709/206 |
| 7,054,905 B1 * | 5/2006 | Hanna et al. ................. 709/206 |
| 7,058,685 B1 * | 6/2006 | van Zee et al. .............. 709/206 |
| 7,069,296 B2 * | 6/2006 | Moller et al. ................ 709/203 |
| 7,082,439 B1 * | 7/2006 | Hickman et al. ........... 707/104.1 |
| 7,127,515 B2 * | 10/2006 | Patterson ..................... 709/229 |
| 2002/0049815 A1 * | 4/2002 | Dattatri ........................ 709/206 |

(Continued)

FOREIGN PATENT DOCUMENTS

JP     60-85647     5/1985

(Continued)

*Primary Examiner*—Salad Abdullahi
(74) *Attorney, Agent, or Firm*—Kilpatrick Stockton LLP

(57) ABSTRACT

A message transmission and reception controlling method is provided which is excellent in certainty, reliability and confidentiality and in which the situation of a message as transmitted can always be confirmed by each of the sender and the addressee. Message property information H is generated from the message M to define the message M in correspondence with the user who transmits the above described message M and the user who receives the message M. The user can receives the message body information C as defined in the message property information H by browsing the message property information H. The message property information H belonging to the user as the sender and the message property information H the user as the addressee are updated in synchronism with the access to the message body information C so that it is possible to confirm the message transmission and reception situation of the message body information C by browsing the message property information H.

3 Claims, 12 Drawing Sheets

U.S. PATENT DOCUMENTS

2002/0112007 A1* 8/2002 Wood et al. .................. 709/206
2005/0108344 A1* 5/2005 Tafoya et al. ............... 709/206

FOREIGN PATENT DOCUMENTS

| | | |
|---|---|---|
| JP | 6-290121 | 10/1994 |
| JP | 8-129515 | 5/1996 |
| JP | 8-167913 | 6/1996 |
| JP | 10-107838 | 4/1998 |
| JP | 10-293732 | 11/1998 |
| JP | 11-88410 | 3/1999 |
| JP | 11-205377 | 7/1999 |
| JP | 11-282777 | 10/1999 |
| JP | 2000-82027 | 3/2000 |

* cited by examiner

FIG.4

| MESSAGE GENERATION | REPLY | TRANSFER | MOVE | DELETE |

◇ RECEPTION FOLDER
◇ COMPANY ITEMS

MESSAGES:5, TO BE READ:1

| NOT READ | TITLE | SENDER | RECEPTION DATE |
|---|---|---|---|
| | NOTICE OF RE-SCHEDULING THE REGULAR MEETING | User01「AAA001」 | 2000/04/01 (Mon.) 8:00 |
| | IN RE THE REGULAR MEETING 3 | User01「AAA001」 | 2000/03/29 (Fri.) 19:00 |
| | IN RE THE REGULAR MEETING 2 | User01「AAA001」 | 2000/03/29 (Fri.) 13:00 |
| | IN RE DIRECT MAILS | User11「BBB011」 | 2000/03/28 (Th.) 17:00 |
| | IN RE THE REGULAR MEETING | User01「AAA001」 | 2000/03/28 (Th.) 10:00 |

FIG.5

| MESSAGE AS SEND | | |
|---|---|---|
| SENDER | User01 | TRANSMISSION TIME 2000/04/01 (Mon.) 8:00 |
| ADDRESSEES | User02, User03 | |
| TITLE | NOTICE OF RE-SCHEDULING THE REGULAR MEETING | |

| USER NAME | READ/NOT READ | CONFIRMATION TIME |
|---|---|---|
| User2 | READ | 9:05(00/04/01) |
| User3 | NOT READ | SUCCESSFULLY TRANSMITTED |

~ i

GOOD MORNING!

TODAY'S MEETING IS CHANGED TO AT ONE O'CLOCK IN THE AFTERNOON.

PLEASE DON'T ATTEND AT A WRONG TIME BY MISTAKE.

FIG.12

MESSAGE PROPERTY INFORMATION

| PROPERTY NAME | SUPPLEMENTS/REMARKS |
|---|---|
| TIME OF CREATION | THE DATA AND TIME WHEN THE MESSAGE IS GENERATED |
| TITLE (CASE NAME) | THE CASE NAME OF THE MESSAGE AS LINKED |
| USER ID OF THE SENDER | OWNER OF THE MESSAGE AS LINKED=SENDER'S ID |
| TIME OF TRANSMISSION | DATE AND TIME OF LINKING (=TRANSMITTING) THE MESSAGE |
| INFORMATION OF THE LINK | INFORMATION INDICATIVE OF THE LINK (LOCATION) TO THE MESSAGE BODY |
| TIME OF CREATION | THE DATE AND TIME WHEN THE CONTENT IS GENERATED |

(a)

MANAGEMENT INFORMATION

| UPDATE TIME | THE LATEST DATA AND TIME WHEN THE INFORMATION IS UPDATED BY MANIPULATIONS OF THE OWNER |
|---|---|
| DECRYPTION KEY OF THE BODY | COMMON KEY AS USED WHEN ENCRYPTED |
| SITUATION OF TRANSMISSION | NOT YET TRANSMITTED OR THE DATA AND TIME OF THE TRANSMISSION IF HAVING TRANSMITTED |
| EFFECTIVE PERIOD | SHORTEST PERIOD DURING WHICH THE CONTENT IS AVAILABLE. A MESSAGE CAN BE DELETED IF THE PERIOD HAS EXPIRED. |
| USER INFORMATION | MAY BE MORE THAN ONE (REFER TO FIG.12(c)) |

(b)

USER INFORMATION

| USER ID OF THE ADDRESSEE | USER ID OF THE ADDRESSEE |
|---|---|
| TYPE OF THE ADDRESSEE | To/Cc/Bcc |
| PERMISSION | INFORMATION SUCH AS COPY ALLOWED/COPY & TRANSFER ALLOWED/COPY & TRANSFER & MODIFICATION ALLOWED AND SO FORTH |
| SITUATION | INFORMATION INDICATIVE OF NOT YET TRANSMITTED/TRANSMISSION FAILS/NOT YET READ /HAVING ALREADY READ/UPDATED /NOT YET READ AFTER UPDATED AND SO FORTH |
| TIME | RECORDING THE DATA AND TIME WHEN UPDATED AS "HAVING ALREADY READ" OR THE DATE AND TIME WHEN UPDATED IN SYNCHRONISM WITH THE ABOVE "SITUATION" PROPERTY |

(c)

MESSAGE BODY INFORMATION

| MESSAGE BODY | "INFORMATION" WRITTEN BY THE USER AS IT IS |
|---|---|

(d)

MESSAGE TRANSMISSION AND RECEPTION CONTROLLING SYSTEM

CROSS-REFERENCE TO RELATED APPLICATION

This application claims the benefit of International Application No. PCT/JP01/05497 filed Jun. 27, 2001.

FIELD OF THE INVENTION

The present invention is related to a message transmission and reception controlling method and a message transmission and reception controlling system for transmitting and receiving messages through a communication network.

BACKGROUND OF THE INVENTION

Conventionally, the use of e-mail has been popularized as means of communication through a communication network. An e-mail is written with a terminal (for example, a personal computer) by a sender and then transmitted by communication means such as a telephone line to a company (provider) which provides access to the Internet for the sender with his mail account. The internet provider serves to temporarily stores the mail in an e-mail server and then transfer it through the Internet to the internet provider which has issued the mail account of the addressee. Since the mail as transferred is stored in the e-mail server of the internet provider of the addressee, the mail can be received by the addressee with a terminal (for example, a personal computer) when he make connection of the terminal with the internet provider through communication means such as a telephone line and send a request for transmission of the mail in response to which the internet provider transmits the mail stored in the e-mail server to the terminal of the addressee through communication means such as a telephone line.

However, it has been recognized that there are following problems in the case of the existing e-mail systems.

Since the current situation of the delivery of the e-mail depends on the settings of the respective transmission and relay point servers, it is not certain that the e-mail as transmitted by a sender is quickly passed through the Internet and immediately received by the addressee server.

Also, the sender server does not guarantee delivery of a mail, and it is not certain that the addressee server transmits an notification of completion of the operation which is received by the sender server, and therefore the sender of the mail can not know very important information relating to communication, i.e., "when the mail was delivered to the addressee" and "when the addressee read the mail".

Furthermore, it is also not certain that the sender can confirm the fact of if the transmission fails, and therefore the sender can not certainly know a very important problem relating to information delivery, i.e., "the mail as transmitted has not been received by the addressee".

Furthermore, since no encryption mechanism is implemented in the communication protocols, SMTP (Simple Mail Transfer Protocol) and POP (Post office Protocol), the mail is usually exchanged in terms of plane texts. Because of this, the confidentiality of e-mail is not sufficiently secured so that it is difficult to use a mail for important correspondence, messages which require high confidentiality and so forth.

Furthermore, since typical e-mail browsing software (mail client software) downloads the mail contents from an e-mail server, it is necessary to set up mail software for each mail terminal and for each mail account so that the setup procedure is troublesome for such a user as makes use of a plurality of terminals or a plurality of mail accounts. Furthermore, in the case of the above software, the setup is made in order that a mail is deleted from the server after downloading the same so that once a mail is read with one terminal, the mail can not be read with any other terminal and therefore mails are scattered about the respective terminals. For this reason, information carried by the e-mail is scattered to impede effective communication.

DISCLOSURE OF THE INVENTION

It is an object of the present invention to solve the above described problems and to provide a message transmission and reception controlling method and a message transmission and reception controlling system which are excellent in certainty, reliability and confidentiality and in which the situation of a message as transmitted can always be confirmed by each of the sender and the addressee.

In order to accomplish the above described object, the message transmission and reception controlling method in accordance with the present invention is characterized by the provision of the following requirements for controlling the reception and transmission of messages through a communication network, i.e., (a) individually setting for each user a user account and a message property information database which is used to store message property information relating to a message such as the sender, the addressee, the date and time of the transmission, whether or not having received, the reception time, the title and so forth;

(b) generating, when a user sends a message, the above described message property information corresponding to the user who sends the message and all the user(s) as the addressee(s) of the message, and storing the message property information as generated in the message property information database as provided belonging to each user respectively;

(c) enabling a user to browse the message property information database belonging to the user through the communication network;

(d) enabling a user to receive a message as defined in the above described message property information by browsing the message property information database belonging the user and designating and requesting an arbitrary message as selected among from the message property information stored in the message property information database;

(e) enabling a user to confirm the message transmission and reception situation of a message as defined in the above described message property information by browsing arbitrary message property information included in the message property information database belonging the user.

Meanwhile, when said user receives a message which has not been read yet, the message property information of a user as a sender and the message property information of a user as an addressee are synchronized with each other relating to the reception in order to secure the coidentity between the message property information of a user as a sender and the message property information of a user as an addressee.

Also, the message body may including the information proper to be conveyed of a message as transmitted by said user is stored in a message body information storage area.

Meanwhile, said message body information storage area is preferably a message body information storage area which is provided individually for the user who has transmitted said message.

It is preferred that, by providing at least one of said message property information and said message body with user permission information about the permission of reading, writing, deletion, transfer and the like operation relating to messages, the message body is prevented from being manipulated by any request for an unauthorized operation and any operation request from a user who does not accord with the user permission information.

Also, it is preferred that information for controlling the reception and transmission of messages, such as whether or not the transmission of a message has been completed, whether or not the addressee has received the message and so forth, is added to said message body in place of said message property information, and that the message property information is limited to that required for accessing the message body information, while information which is updated by the reception and transmission of a message is added to the message body, in order not to scatter the information as updated.

At least one of said message body and the message property information may be encrypted and saved.

The message transmission and reception controlling system in accordance with the present invention is characterized by provision of the following requirements for controlling the reception and transmission of messages through a communication network, i.e., (a) individually setting for each user a user account and providing a message property information database unit in which is stored message property information relating to a message such as the sender, the addressee, the date and time of the transmission, whether or not having received, the reception time, the title and so forth and a message body information storage unit in which is stored the message body of the message transmitted as information proper to be conveyed;

(b) when the message as transmitted by the user is received by said message processing server, storing the message body including the message body of the message transmitted as information proper to be conveyed from the message as received into the message body information storage unit, generating the message property information such as the sender, the addressee, the date and time of the transmission, whether or not having received, the reception time, the title and so forth for defining the message corresponding to the user who sends the message and all the user(s) as the addressee(s) of the message, storing the respective message property information in the message property information database of said message property information database unit belonging to the user;

(c) permitting a user who accesses the message processing server through the communication network to browse the message property information database belonging to the user;

(d) enabling a user to receive a message body as defined in the message property information by browsing the message property information database belonging the user, designating an arbitrary message property information and requesting the message body thereof to said message processing server;

(e) enabling a user to confirm the message transmission and reception situation of a message as defined in the message property information by accessing said message processing server and browsing arbitrary message property information included in the message property information database belonging the user.

It is preferred that, when said user receives a message which has not been read yet, the message property information of a user as a sender and the message property information of a user as an addressee are synchronized with each other relating to the reception by said message processing server in order to secure the coidentity between the message property information of a user as a sender and the message property information of a user as an addressee.

It is preferred that the message body information storage unit for storing said message body information is a message body information storage unit which is provided individually for the user who has transmitted said message.

It is preferred that, by providing at least one of said message property information and said message body stored in the message body information storage unit with user permission information about the permission of reading, writing, deletion, transfer and the like operation relating to messages, said message processing server serves to prevent the message body from being manipulated by any request for an unauthorized operation and any operation request from a user who does not accord with the user permission information.

Also, it is preferred that said message processing server serves to add information for controlling the reception and transmission of messages, such as whether or not the transmission of a message has been completed, whether or not the addressee has received the message and so forth said message body in place of said message property information.

It is preferred that at least one of said message body and the message property information is encrypted, and that the decryption key is stored in at least one of the terminal of a user and said message processing server.

Also, the message body information storage unit may be used to store said message body together with files and application software and the like in said message processing server.

It is preferred that said message processing server serves also to control transmission and reception of e-mail, in addition to the control of transmission and reception of messages, in cooperation with an e-mail server which serves to control transmission and reception of messages so as to coexist with an existing e-mail system.

Furthermore, it is possible that when the address of the destination of a message received and transmitted from said user is an address of e-mail, said message processing server serves to convert the message to an e-mail and then to request an e-mail server to transmit the e-mail.

It is preferred that said message processing server is organized in order to distribute at least one process or one process device among from a message reception and transmission process or a process device for performing a message reception and transmission process, a message body information storing process or a process device for performing a message body information storing process, an e-mail reception and transmission process or a process device for performing an e-mail reception and transmission process, and a message property information database process or a process device for processing the message property information data.

BRIEF DESCRIPTION OF THE DRAWINGS

FIG. 4 is a view for explaining the display screen window in which one example of message property information is displayed.

FIG. 5 is an explanatory view for showing the display screen window with which a sender confirms the situation of the message transmitted by him.

FIG. 12 is a presentation (a) to (d) for listing exemplary information in accordance with the above described other example of the message transmission and reception controlling method.

PREFERRED EMBODIMENTS OF THE INVENTION

Figure 1:
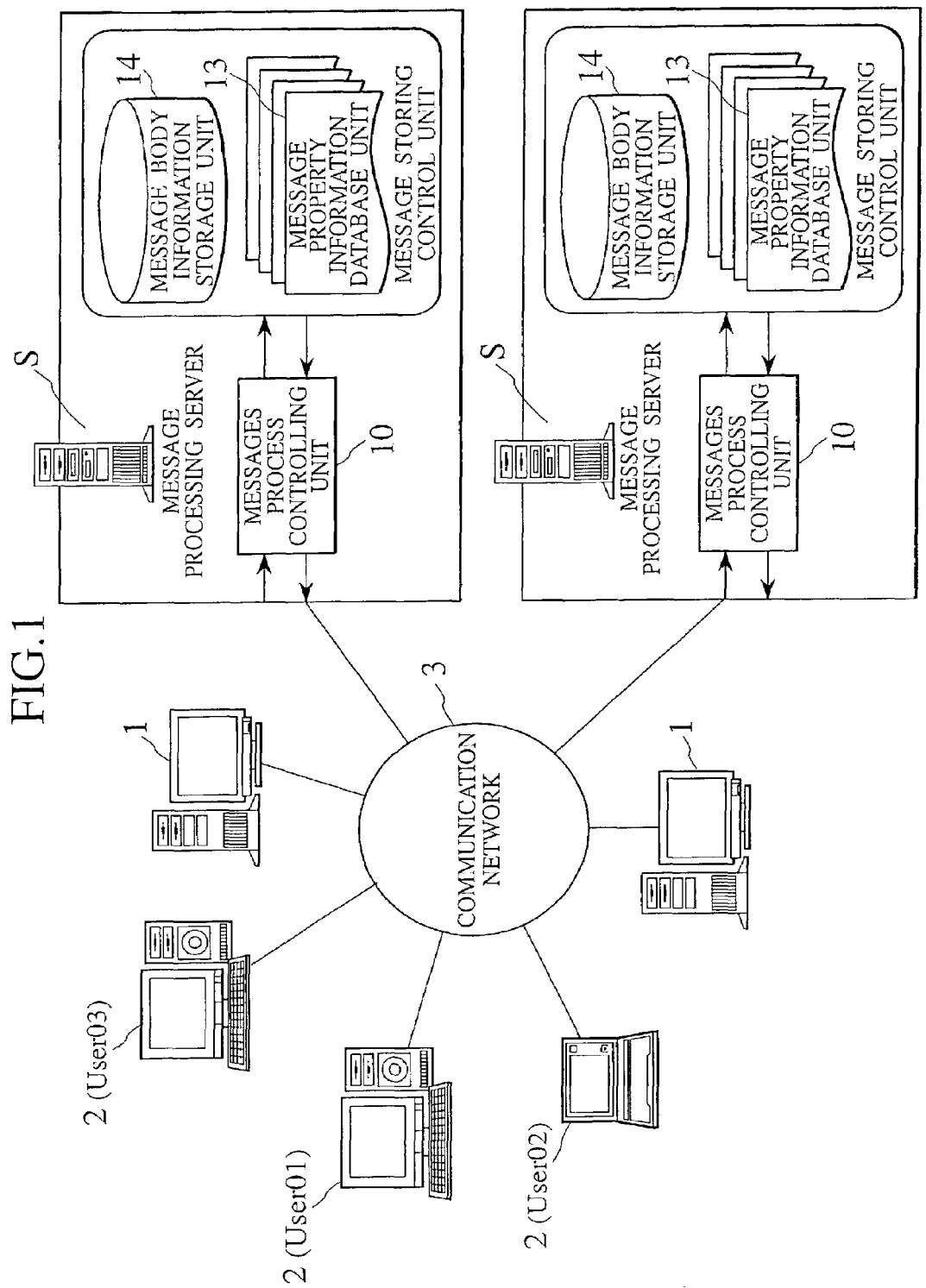
FIG. 1 is a schematic diagram showing a schematic network configuration to which is applied a message transmission and reception controlling method in accordance with the present invention.
Figure 2:
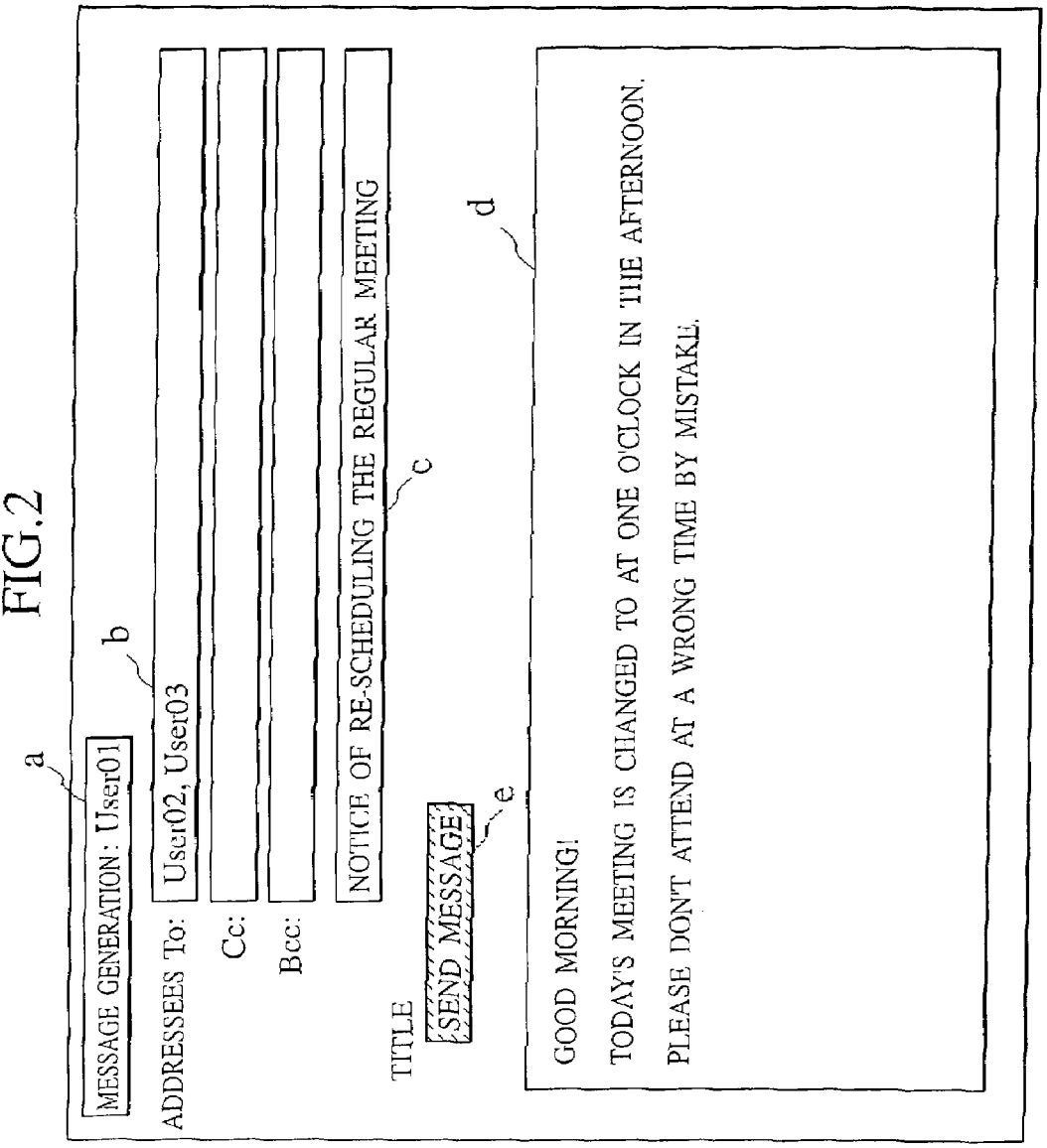
FIG. 2 is a view for explaining the manipulation screen for manipulating a message as written by a sender.

FIG. 1 shows one example of a schematic network configuration view for explaining a message transmission and reception controlling method and a message transmission and reception controlling system for controlling the reception and transmission of messages through a communication network. In this schematic network configuration view, a number of host computers 1 are connected to a number of user terminals 2 through a communication network. Particularly, the host computer 1 that performs the message transmission and reception controlling method in accordance with the present invention is referred to as a message processing server S.

The above described message processing server S serves to receive a message which is send through the communication network 3 by a user terminal 2 as a sender with which the message is written, and serves to transmit the message through the communication network to a user terminal 2 as the addressee of the message in response to the request from the user terminal 2 as the sender. While it is assumed that the communication network is the Internet in this description of the present embodiment, the communication network is not limited to the Internet but can be a LAN, or the combination of a LAN and the Internet.

In FIG. 1, when a user 2 (User01) sends a message through the communication network 3 to other users 2 (User02,03), the sender, i.e., the user 2 (User01), is input to a sender input box "a"; the addressee, i.e., the users 2 (User01,03) are input to an addressee input box "b"; the title attached to the message is input to a title box "c"; the contents of the message to be transmitted is input to a message box "d"; and after the information necessary for transmission is input to the user terminal a transmission execution key "e" is selected in order to transmit the message.

When the message as written is transmitted, the message processing server S having received the message serves to create message property information including the sender, the addressee, the transmission time, whether or not having received, the reception time, the title and so forth in correspondence with the user 2 (User01) transmitting the message and all the users 2 (User02,03) receiving the message.

Figure 3:
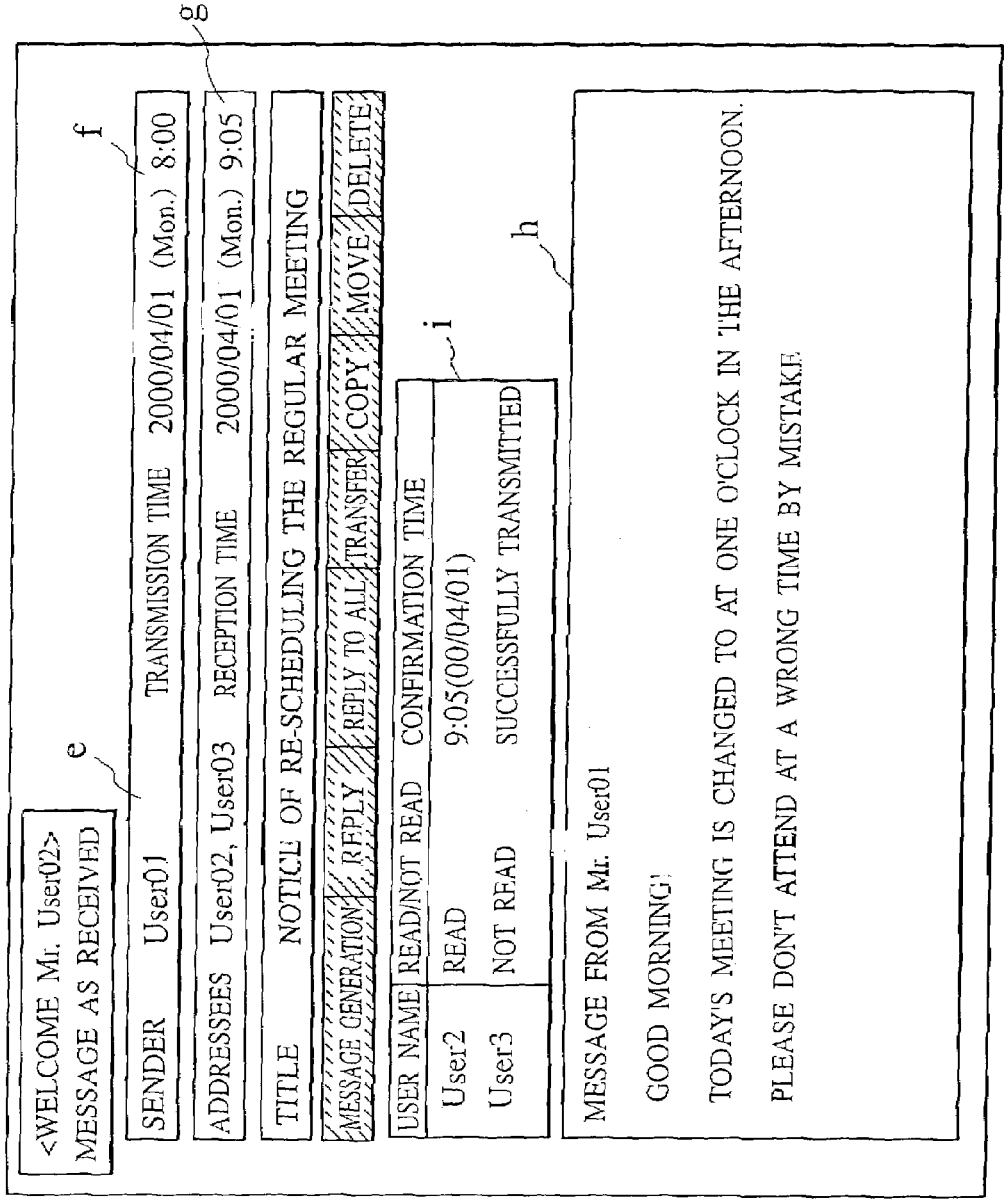
FIG. 3 is a view for explaining the display screen window when an addressee receives a message.

FIG. 3 is a schematic diagram showing a reception screen, when User02 as one of the users 2 (the addressees) receives a message. In the case where the addressee 2 (User02) obtains his message property information (refer to FIG. 4) in which are recorded messages addressed to him, the content of a message(s) is transmitted to the user 2 (User02) automatically or when the user 2 (User02) as the addressee selects some of the titles (for example, a message associated with an icon indicative of the fact that the message has not been read yet) in order to request the message. In this case, if the message as requested had not been read before transmission, the message property information item belonging to the above described message of the user 2 (User02) is updated with the fact that the content of the message has been received by the user 2 (User02) with the date and time when the message is received and the like relating to the reception.

Furthermore, in synchronism with the update of the message property information of the addressee, the message property information item belonging to the above described message of the sender is updated with the fact that the message addressed to an addressee has been received by the addressee with the date and time when the message is received and the like relating to the reception.

By this configuration, the name of User01 as the sender is displayed in a sender name display box "e"; the time when the sender sends the message is displayed in a transmission time display box "f"; and the date and time when the addressee 2 (User02) receives the message is displayed in a message reception time display box "g". The message is displayed in a message display box "h" so as to display, in a message transmission and reception display box "i", the information indicative that the message property information of the addressees and the message property information of the sender relating to the message is updated (refer to FIG. 3).

Also, the message property information belonging to the above described message of the sender is updated in synchronism with the message property information of the addressee in order that the message property information belonging to the message of the sender includes information indicative of the fact that the message addressed to an addressee has been received by the terminal of the addressee and information about the date and time when the message is received and the like relating to the reception, and therefore User01 as the sender can confirm the message property information belonging to User01, as updated, by selecting the manipulation screen (refer to FIG. 5) for confirming the situation of the message as send.

Since User03 has not received the message at this time, the message property information of the sender and the respective addressees is updated by writing only information indicative of the fact that User02 confirms the message. By this configuration, each of the message sender and the message addressee can be informed of the delivery of the message by confirming the delivery situation in the message transmission and reception display box "i".

Figure 6:
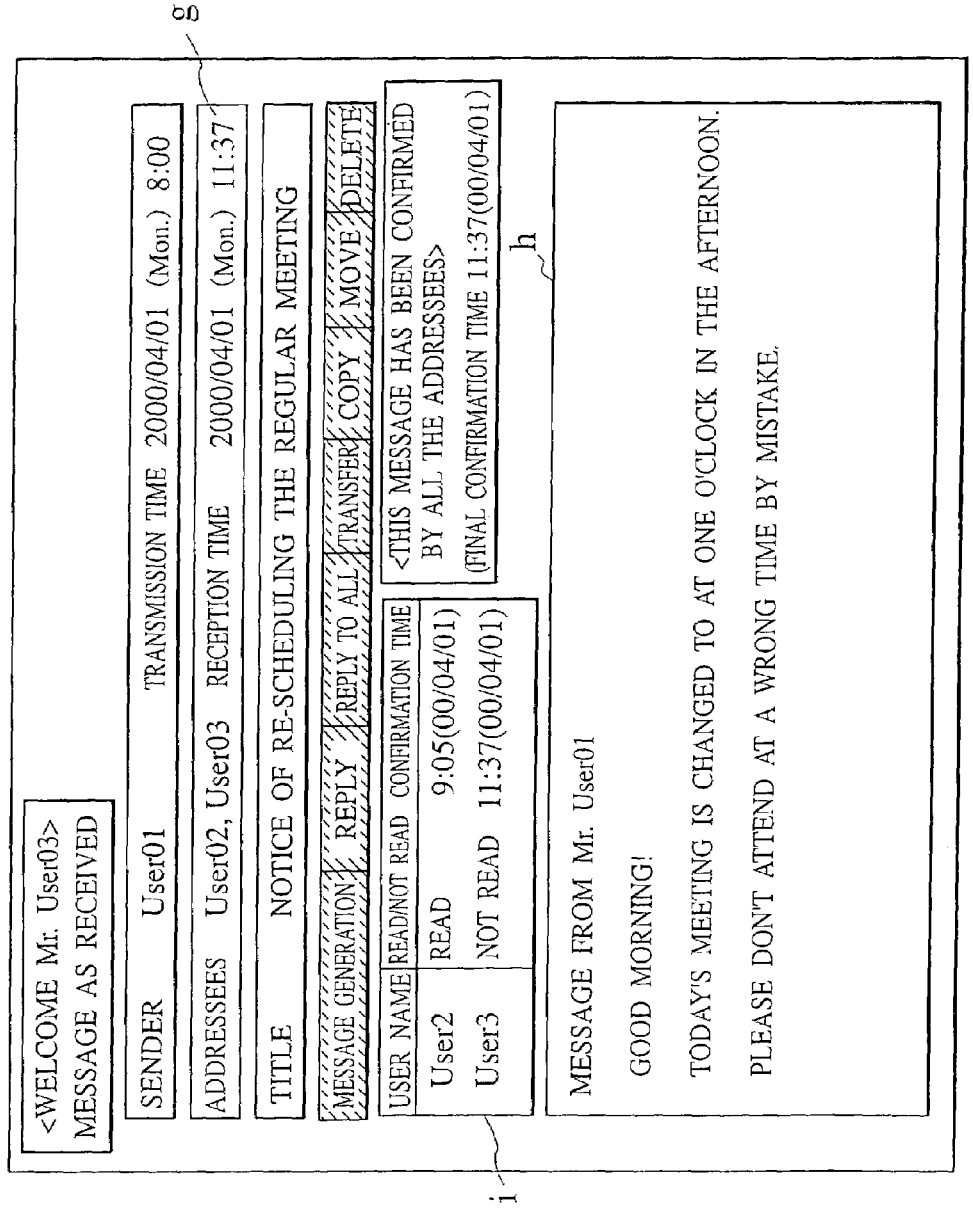
FIG. 6 is a view for explaining the display screen window when an addressee receives a message.

FIG. 6 is a view showing one example of a display screen window when the message is received by an addressee User03 who had not yet read the message. Since User03 read the message, there is displayed in the message reception time display box "g" the date and time when the addressee 3 (User03) received the message, Since the message is displayed in the message display box "h", there is displayed in the message transmission and reception display box "i" the information indicative that the message property information of the addressee and the message property information of the sender relating to the message are updated.

Figure 7:
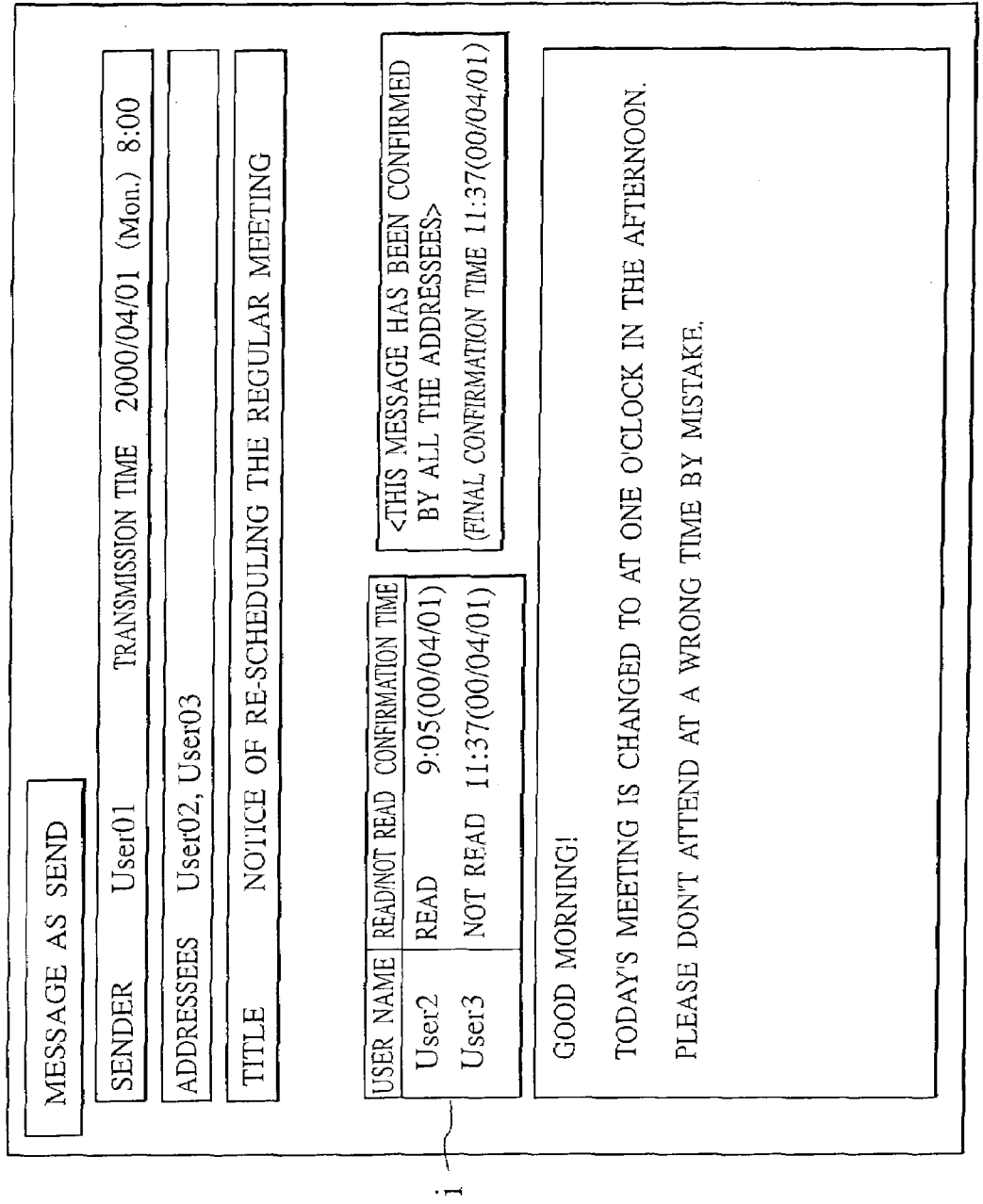
FIG. 7 is an explanatory view for showing the display screen window with which a sender confirms the situation of the message transmitted by him.

Also, FIG. 7 shows one example of a transmission confirmation screen provided for the sender. Since User03 read the message, the message property information belonging to the respective users, i.e., the sender and the respective addressees is updated to indicate that the entirety of the information has been browsed. By this configuration, the current situation is displayed in the message transmission and reception display box "i" automatically or when the sender selectively requests the message property information. By this configuration, the sender can confirm the fact that the message he send has been transmitted without fail and, at the same time, can obtain information about the times when the respective messages are browsed.

Meanwhile, the message transmission and reception display box "i" as described above may be used to inform the sender and all the addressees of the reception situation. Alternatively, it is possible to limitedly disclose the reception situation to the respective addressees or to disclose the reception situation only to the sender.

Figure 8:
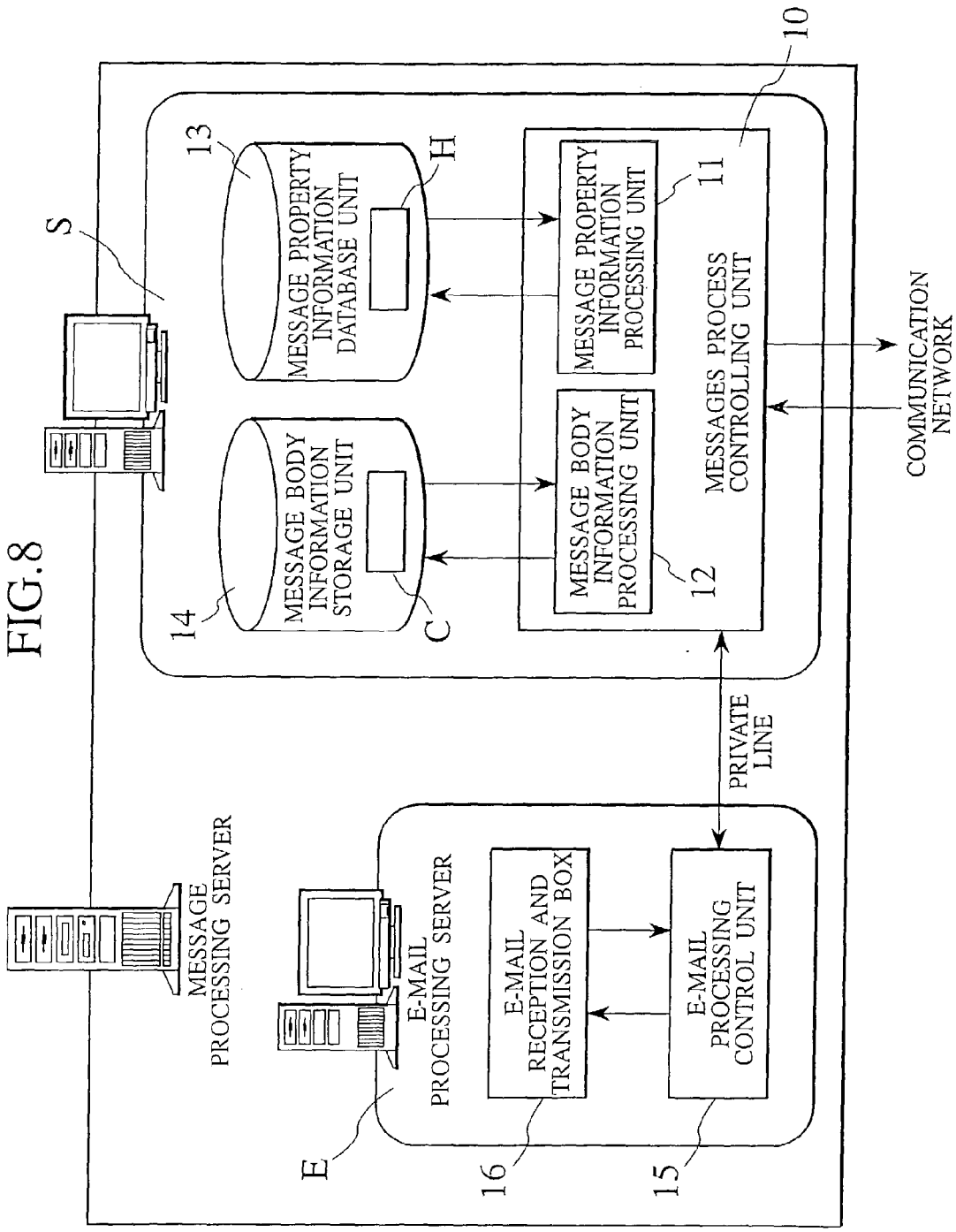
FIG. 8 is an organization diagram of the message processing server.

FIG. 8 shows one example of a schematic configuration diagram of the message processing server S serving to control the message transmission and reception process as described above. This message processing server S is implemented with an associated e-mail process server E which is connected to the message processing server S via a private line and the like in order to exchange information therebetween. This configuration is designed in order that an internet connection providing company (referred to as an internet provider in the following description) provides an e-mail transmission and reception controlling service by means of an e-mail process server E of the prior art and also provides the message transmission and reception controlling method in accordance with the present invention. If such an e-mail transmission and reception controlling service is not necessary, the configuration is implemented only with the message processing server S.

In FIG. 8, the messages process controlling unit 10 serves to provide an interface with the communication network and invoke a message property information processing unit 11 within the messages process controlling unit 10 in order to process the message property information contents, relating to the message as transmitted and the message as received, such as the senders, the addressees, the date and time of the transmission, whether or not the message has been received, the date and time of the reception, the title and so forth, and also invoke a message body information processing unit 12 within the messages process controlling unit 10 in order to process the message body containing the communication contents.

The message property information is provided, in the message property information processing unit 11, with additional control information such as a reference key to the message body, a decryption key if the message is stored as an encrypted text, the date and time when transmitted, whether or not the user as an addressee has been received, the date and time of the reception and so forth, and stored in a message property information database unit 13 as the message property information H belonging to the message corresponding to the sender of the message and each of all the addressees of the message.

Then, the message body is provided in the message body information processing unit 12 with linking information (for example, a reference key, a user key and so forth) to the above described message property information H and stored in a message body information storage unit 14 as a message body C. There are separately allocated message body information storage areas in the message body information storage unit 14 to the respective users while the message body information processing unit 12 serves to store the message body C in corresponding one of the message body information storage areas of the message body information storage unit 14 with reference to the linking information (for example, the user key) as added.

Meanwhile, the message property information H may include user information about the permission of reading, writing, deletion, transfer and the like relating to the above described message body C (for example, the message sender is permitted to read, write and delete the message body C while a message addressee is permitted to read the message body C) while the operations using the above described message body C may be restricted if the user does not correspond to the user information or if the user corresponding to the user information requests an unauthorized operation. In accordance with the above described configuration, the confidentiality of messages can be secured by protecting the message body C against overstepping accesses by an administrator and unauthorized users for reading, writing, deleting, transferring the message body C and the like operation. Furthermore, even in the case where the server is attacked or invaded, the confidentiality of the message body C can be maintained.

Still further, the above described message body C may be stored as an encrypted text in the message body information storage area of the message body information storage unit 14 while the decryption key required for decryption of the encrypted text may be stored in the message property information H corresponding to the above described message body C as additional information. In accordance with the above described configuration, since the encryption of the message body C can not be decrypted unless accessed with the message property information H including the decryption key, the confidentiality of messages can be improved in the same manner as described above.

Meanwhile, the decryption key may be stored in the terminal of a user in order that when the user browses a message the message processing server S serves to transmit the message body C as having been encrypted to the terminal followed by decrypting it at the terminal.

Also, the message processing server S is implemented with a cryptographic processing unit (not shown in the figure), which serves mainly to perform encryption and decryption, as a predetermined area other than the message property information database unit 13 and the message body information storage unit 14. When a user requests decryption of a message body C, the message processing server S serves to access to the message property information H belonging to the individual user and also to the cryptographic processing unit to obtain a decryption key for decrypting the message while the cryptographic processing unit serves to judge whether or not the decryption key can be delivered with reference to the message property information H, and if affirmative the decryption key is given to the message body information storage unit 14 to disclose the message body C to the user so that the load on the message processing server S is lessened by distributing the tasks.

Furthermore, different encryption keys are stored respectively in the message processing server S and the terminal of a user in order to generate a decryption key of data by collating or combining them together.

When there is a request from a user for disclosure of the message body C, the encryption key of the terminal which is maintained in the terminal or by the user in the form of a password or an external storage device is requested by the cryptographic processing unit which is responsible for managing the encryption key in the message processing server S, the encryption process and the decryption process. A decryption key is generated from the two encryption keys, i.e., the encryption key of the terminal and the encryption key of the server, by the cryptographic processing unit.

Then, the user 2 accesses to the message processing server S, and when there is the message property information H belonging to him, requests the message processing server S for transmission of the message body C. The messages process controlling unit 10 then invokes the message body information processing unit 12 to read out the message body C corresponding to the message property information H from the message body information storage unit 14 by referring to the message property information H through the message property information processing unit 11 and transmit the message body C as read out to the user 2. Also, at the same time, the messages process controlling unit 10 invokes the message property information processing unit 11 to update the message property information H belonging to the user as the addressee relating to whether or not the message property information H has been received and the date and time when received and also to update, in synchronism therewith, the message property information H belonging to the user as the sender so that it is possible to synchronize the message property information of the user as the sender and the message property information of the user as the addressee.

Figure 9:
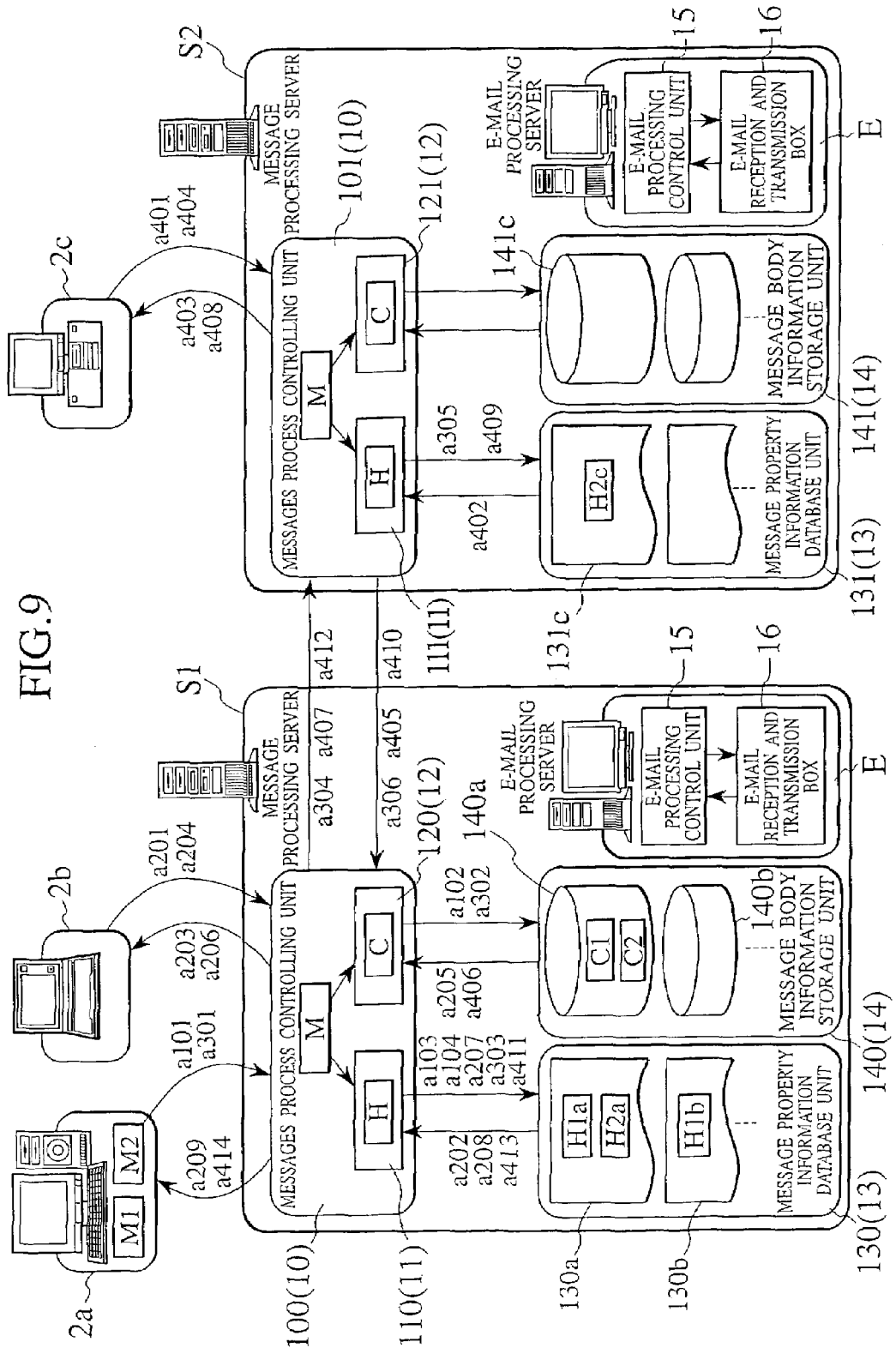
FIG. 9 is a view for explaining the operation of the message controlling method and the flows of messages and message property information in accordance with the message transmission and reception controlling method.

Next, one example of controlling the reception and transmission of a message by the message processing server when a user sends the message will be explained with reference to FIG. 9.

In the case where a user 2a (the sender) sends a message M1 to a user 2b who has a user account in the same message processing server S1 as the user 2a, the user 2a writes the message M1 with his terminal and accesses to the message processing server S1 on the basis of the user account belonging to the user 2a in order to transmit the message M1 to the message processing server S1 (a101).

The messages process controlling unit 100 of the message processing server S1 serves to receive the message M1 as transmitted from the terminal of the user 2a and divide it into the message body C1 and the message property information H1. The message body C1 is then stored in the message body information storage area 140a of the message body information storage unit 140 belonging to the user 2a by the message body information processing unit 120 in the messages process controlling unit 100 (a102).

The message property information processing unit 110 in the messages process controlling unit 100 then serves to add, to the message property information H1, additional information of the date and time of the message transmission, whether or not the addressee has read, the location where the message body C1 is stored, the decryption key if the message body C1 is encrypted and the like information, followed by storing the message property information H1 in the database area 130a of a message property information database unit 130 belonging to the user 2a as a message property information H1a (a103).

Also, in synchronism therewith, the message property information H1a is stored in the database area 130b belonging to the user 2b (the addressee). Since the user 2b has a user account in the same message processing server S1 as the user 2a, the message property information H1b is stored in the database area 130b belonging to the user 2b (the addressee) with the same contents as the message property information H1a (a104).

On the other hand, the user 2b as the addressee of the message M1 accesses to the message processing server S1 (a201) on the basis of the user account registered belonging to the user 2b, and browses the message property information H1b of the message M1 belonging to him as stored in the database area 130b in the message property information database unit 130 belonging to the user 2b through the message property information processing unit 110 of the message processing server S1 (a202 and a203).

Since the message property information H1b contains the linking information to the message body C1, when the user 2b requests transmission of the message body C1 to the message processing server S1 by designating the message property information H1b (a204), the message processing server S1 invokes the message body information processing unit 120 to transmit the message body C1 as stored in the message body information storage area 140a belonging to the user 2a (a205 and a206) to the terminal of the user 2b. By this procedure, the user 2b can receive the message M1 which is transmitted from the user 2a.

In this manner, after the message property information H1b has been stored in the database area 130b belonging to the user 2b, the user 2b can receive the message M1 as transmitted from the user 2a by browsing the database area 130b belonging to the user 2b and therefore there is prepared, when the message property information H1a and the message property information H1b is synchronized and stored, such a condition that the user 2b can receive a message anytime.

Also, after confirming that the user 2b has received the message body C, the message processing server S1 invokes the message property information processing unit 10 to update the message property information H1a and the message property information H1b relating to the message M1 within the database area 130a belonging to the user 2a and the database area 130b belonging to the user 2b in the message property information database unit 130 (a207).

The user 2a can confirm that the message M1 has certainly been received by the user 2b by accessing again the message processing server S1 to browse the message property information H1a of the message M1 as stored in the database area 130a belonging to the user 2a (a208 and a209).

With respect to storing or updating the message property information database unit 130 of said message property information H1a and the message property information H1b, it is preferred to synchronize with each other. However, when some trouble occurs during the above described storing operation, both are updated or otherwise neither is updated to indicate an operation error so that it is not the case that only one of the message property information H1a and the message property information H1b is updated. Furthermore, when both are updated in synchronism with each other, a temporary storage device and a storing control unit (not shown in the figure) are invoked to temporarily store the message property information H1a and the message property information H1b in synchronism with each other in order to accomplish the equivalent effects.

Meanwhile, in the case where a message is generated and received/transmited by the use of the above described terminal, the administrator as an operations manager of the message processing server may supply the user with an editor for use in writing a message by means of a storage medium such as CD-ROM. Alternatively, an editor for use in writing a message can be downloaded to the terminal of the user in order that the user writes and receives/transmits by the use of the editor.

Next, in the case where the user 2a sends a message M2 to a user 2bwho has a user account in a message processing server S2 which is different than the message processing server of the user 2a, the user 2a writes the message M2 with his terminal and accesses to the message processing server S1 on the basis of the user account belonging to the user 2a in order to transmit the message M2 to the message processing server S1 (a301).

The messages process controlling unit 100 of the message processing server S1 serves to receive the message M2 as transmitted from the terminal of the user 2a and divide it into the message body C2 and the message property information H2. The message body C2 is then stored in the message body information storage area 140a of the message body information storage unit 140 belonging to the user 2a by the message body information processing unit 120 in the messages process controlling unit 100 (a302).

The message property information processing unit 110 in the messages process controlling unit 100 then serves to add, to the message property information H2, additional information of the date and time of the message transmission, whether or not the addressee has read, the location where the message body C2 is stored, the decryption key if the message body C2 is encrypted and the like information, followed by storing the message property information H2 in the database area 130a of the message property information database unit 130 belonging to the user 2a as a message property information H2a (a303).

On the other hand, in synchronism with the above described operation, the messages process controlling unit 100 of the message processing server S1 requests the message processing server S2 having the user account of the user 2c as an addressee of the message M2 for writing the message property information H2a as updated of the message M2(a304).

In response to the request from the above described message processing server S1, the message processing server S2 invokes the message property information processing unit 111 in the messages process controlling unit 101 to store, as the message property information H2c, the message property information H2a of the message M2 in the message property information database 131c of the message property information database unit 131 belonging to the user 2c (a305), and returns a response indicative of completion of the operation as requested to the messages process controlling unit 100 of the message processing server S1 (a306).

On the other hand, the user 2c as the addressee of the message M2 accesses to the message processing server S2 (a401) on the basis of the user account registered belonging to the user 2c, and browses the message property information H1c of the message M2 belonging to him as stored in the database area 130c in the message property information database unit 131 belonging to the user 2c through the message property information processing unit 111 of the message processing server S2 (a402 and a403).

Since the message property information H2c contains the linking information to the message body C2, when the user 2c requests transmission of the message body C2 to the message processing server S2 by designating the message property information H1c (a404), the message processing server S2 requests the message processing server S1 to transmit the message body C2 as stored in the message body information storage area 140 belonging to the user 2a (a405) to the terminal of the user 2c.

In response to the request from the above described message processing server S1, the message processing server S2 invokes the message body information processing unit 120 to transmit, to the user 2c, the message body C2 stored in the message body information storage area 140a of the message body information storage unit 140 belonging to the user 2a (a406, a407 and a408). By this operation, the user 2c can receive the message M2 which is a message from the user 2a.

In this manner, after the message property information H2c is stored in the message property information database 131c for the first time, the user 2c can receive the message M2 as transmitted from the user 2a by browsing the message property information database 131c belonging to the user 2c and therefore a condition that the user 2b can receive a message anytime can be established.

Then, after confirming the reception of the message body C2 by the user 2c, the message processing server S2 invokes the message property information processing unit 111 to store information about the date and time when received and the like in the message property information H2c as stored in the message property information database 131c in the message property information database unit 131 belonging to the user 2c (a409), and also to request the message processing server S1 to record the fact that the user 2c has received the message body C2 in the message property information H2a belonging to the user 2a as the sender (a410).

In response to the request, the message processing server S1 invokes the message property information processing unit 110 to record the fact that the user 2c has received the message body C2 to update the property information H2a in the database area 130a in the message property information database unit 130 belonging to the user 2a (a411), and returns a response indicative of completion of the operation to the message processing server S2 (a412). The user 2a accesses again the message processing server S1 in order to confirm that the message M2 has certainly been received by the user 2c by browsing the message property information H2a of the message M2 as stored in the database area 130a belonging to the user 2a (a413 and a414).

With respect to storing or updating the message property information database unit of said message property information H2a and the message property information H2c, it is preferred to synchronize with each other. However, when some trouble occurs during the above described storing operation both are updated or otherwise neither is not updated to indicate an operation error so that it is not the case that only one of the message property information H2a and the message property information H2c is updated. Furthermore, as described above, when both are updated in synchronism with each other, a temporary storage device and a storing control unit are invoked to temporarily store the message property information H2a and the message property information H2c in synchronism with each other in order to accomplish the equivalent effects.

In accordance with the management scheme as described above, it is possible to certainly control the situation of the reception and transmission by generating, from the message, the message body thereof, the message property information of the addressee and the message property information of the sender relating to the message, and browsing the message property information.

Also, since the message body shall not be transferred to another message processing server from the message body information storage unit of the message processing server having the user account of the sender, the confidentiality of the message is secured without a fear of losing the message due to some trouble during transmission. Furthermore, while it is possible at the sending end to confirm whether or not the addressee has read the message and, if read, the date and time when read, it is possible at the receiving end to obtain the message property information belonging to the receiver and to obtain upon request the body text of the message as defined in the message property information so that the message can be obtained from any terminal for any number of times to prevent messages from being scattered over a plurality of terminals.

Meanwhile, the confidentiality in information communication between the terminal of a user and a message processing server and between a message processing server and a message processing server may be secured by cipher communication by the use of SSL (Secure Socket Layer) and so forth.

Figure 10:
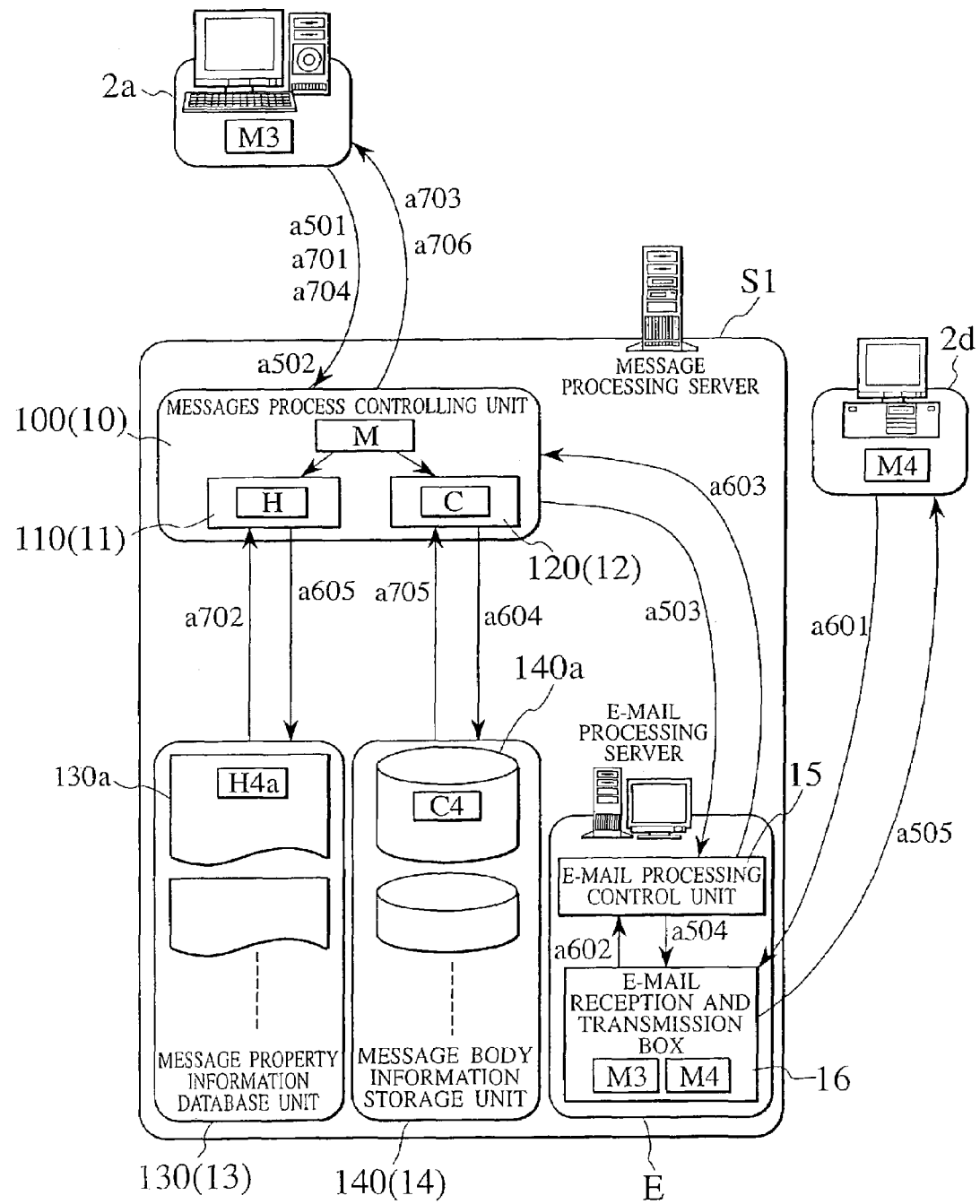
FIG. 10 is a view for explaining the operation of the message controlling method and the processes of existing e-mail in the above described message processing server.

Next, explained with respect to FIG. 10 is the case where the user 2a sends a message to a user 2d of e-mail.

The user 2a writes a message M3 to the user 2d with his terminal and transmit it to the message processing server S1 (a501). The messages process controlling unit 100 of the message processing server S1 serves to receive the message M3 as transmitted from the terminal of the user 2a (a502).

The message processing server S1 serves to confirm that the destination address is belonging to the e-mail user 2d and transfer the message M3 to the e-mail process server E (a503), and then the message M3 is transferred to an e-mail reception and transmission box 16 by an e-mail processing server E (a504). Thereafter, the e-mail M3 is transmitted to the user 2d in accordance with the setting of the e-mail processing server E (a505).

Also, the case where the e-mail user 2d sends a message to the user 2a will be explained.

When the e-mail M4 is transmitted to the e-mail from the user 2d (a601a), the e-mail M4 is then transmitted to the e-mail processing control unit 15 from the e-mail reception and transmission box 16 (a602).

The e-mail processing control unit 15 transfers the e-mail M4 to the messages process controlling unit 100 (a603), which confirms that the destination address of the e-mail M4 is the user 2a followed by dividing it into the message body C4 and the message property information H4.

The message body C4 is saved in the message body information storage area 140a of the message body information storage unit 140 belonging to the user 2a by the message body information processing unit 120 in the messages process controlling unit 100(a604).

The message property information processing unit 110 in the messages process controlling unit 100 then serves to add, to the message property information H4, additional information including the location where the message body C4 is stored, the decryption key if the message body C1 is encrypted and the like information, followed by storing the message property information H4 in the database area 130a belonging to the user 2a as a message property information H4a (a605).

On the other hand, the user 2a as the addressee of the message M4 accesses to the message processing server S1 (a701), and browses the message property information H4b of the message M4 belonging to him as stored in the database area 130a in the message property information database unit 130 belonging to the user 2a through the message property information processing unit 110 of the message processing server S1 (a702 and a703).

Since the message property information H4a contains the linking information to the message body C4, when the user 2a requests transmission of the message body C4 to the message processing server S1 by designating the message property information H4a (a704), the message processing server S1 invokes the message body information processing unit 120 to transmit the message body C4 as stored in the message body information storage area 140a belonging to the user 2a (a705)

to the terminal of the user 2a (a706). By this procedure, the user 2a can receive the message M4 which is transmitted from the user 2d.

As described above, the e-mail M transmitted from the e-mail user is divided by the messages process controlling unit 100 into the mail body containing information proper to be conveyed and the property information of the e-mail. The mail body is stored in the message body information storage unit 140 as the message body C while the property information of the mail is stored in the message property information database unit 130 as the message property information H. Because of this, a user 2 under control of the message processing server S can conduct the reception and transmission of e-mail by the same procedure as in the case of the reception and transmission of messages from another user 2 under control of the message processing server S, and therefore the system in accordance with the present invention can coexist with the e-mail system which is a mainstream at the present day and can provide information processing business with a message reception and transmission service for any user under control of either system.

Figure 11:
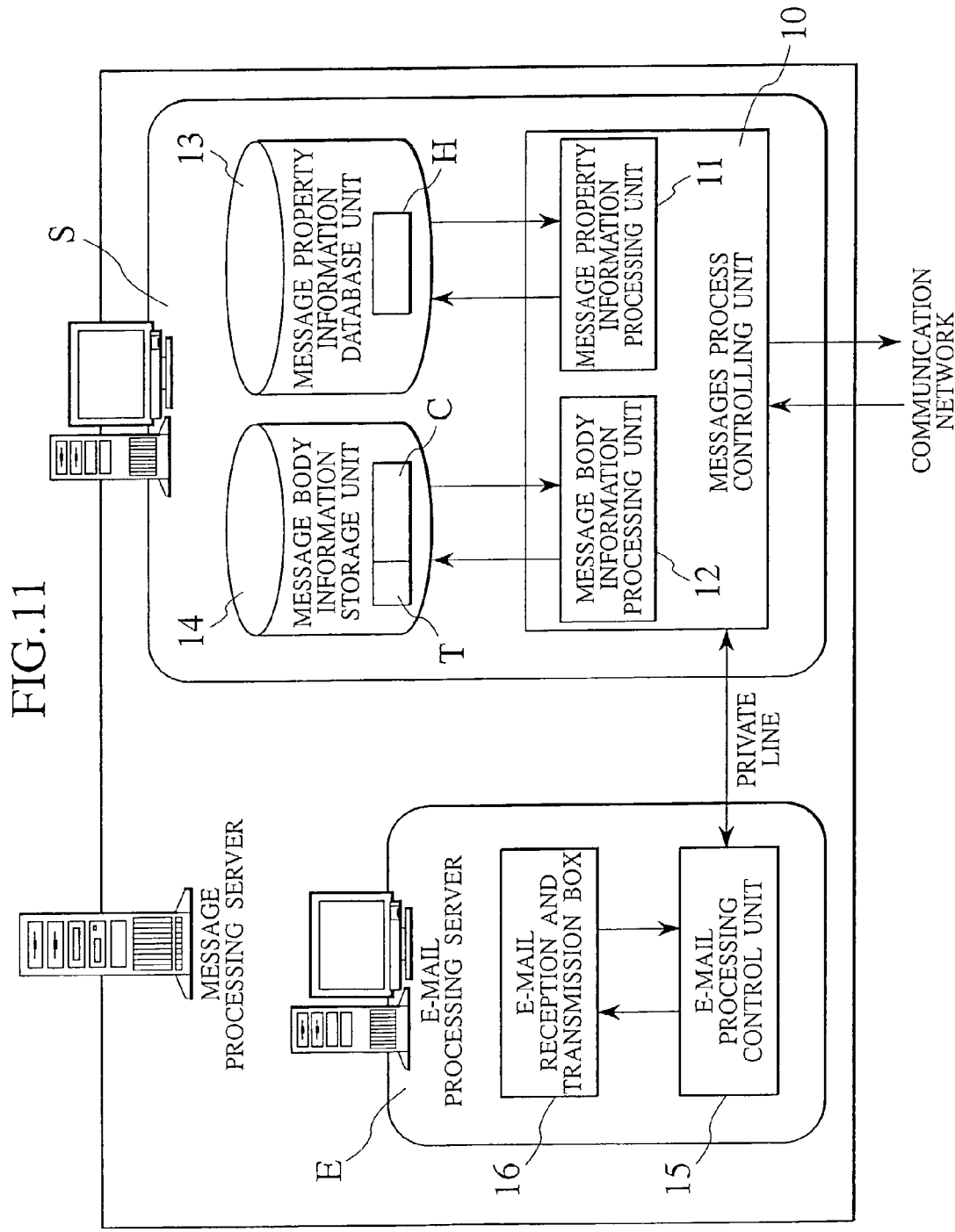
FIG. 11 is an organization diagram of another example of the message processing server.

Also, as illustrated in FIG. 11, the message property information H does not contain all the information relating to the message but rather is used to contain only limited information required for accessing the message body C (for example, the information as illustrated in FIG. 12(a)) while the message body information storage unit 14 is used to contain, as well as the message body C, management information T such as whether or not the transmission of a message has been completed, whether or not the addressee has received the message and so forth for use in management of the reception and transmission of messages (for example, information including items as illustrated in FIG. 12 (b) and FIG. 12(c)).

This message property information H contains description of information required for accessing the message body, for example, the sender of the message, the date and time of the transmission, the linking information to the message body and the like, and therefore is usually not modified so that there does not occur data mismatch due to update trouble between the sender and the destination. Also, since only minimum information is receive/transmitted, it is possible to lessen the load on the message processing server S in processing the reception and transmission operation.

Furthermore, since information as updated (for example, the date and time of the reception) is described in the user information of the management information (refer to FIG. 12(c)), the updating operation is performed with the management information T in the message processing server in which the sender has an account and therefore the management information T is not dispersed to make sure the synchronization of the information. This management information T can be browsed together with the message body C, when accessing the message body C on the basis of the message property information H, in order to obtain information such as whether or not the addressee of the message has browsed and the date and time when browsed.

While the messages process controlling unit, the message body information storage unit, the message property information database unit and the e-mail server are described respectively as one device for each unit (server) in the case of the respective embodiments as described above, it is possible to implement one unit (server) with a plurality of devices or to implement one unit (server) as a partially distributed processing system. Also, while said message body information storage unit and said message property information database unit are provided respectively with information areas belonging to the respective users in the case of the respective embodiments as described above, it is possible to provide individual storage means and database, to distinguish the respective private user areas from each other in a single storage device and a single database, or to add identification symbols for individual users to the information stored in the storage device and the database.

Furthermore, while the message as transmitted from the user terminal is divided into the mail body as the information proper to be conveyed and the property information thereof which are stored in the message body information storage unit and the message property information database unit respectively in the above description, it is possible to divide the message into the message body and the message property information in the user terminal followed by separately transmitting them to the message processing server, to store the entirety of the message in the temporary storage device in the message processing server at the outset and thereafter extract the message property information and the message body respectively followed by storing them respectively in the message body information storage unit and the message property information database unit, or to store the entirety of the message in the message body storage unit and thereafter extract only the message property information followed by storing it in the message property information database unit.

Furthermore, in accordance with the above description, when the message property information is divided into the management information T and the property information H required for accessing the message body, the management information T for use in managing the message body is added to the message body and stored together in the message body information storage unit 14. However, it is possible to divide the message into the message body C, the property information H and the management information T for use in managing the message body followed by separately transmitting them to the message processing server, to store the entirety of the message in the temporary storage device in the message processing server at the outset and thereafter extract the message body C, the property information H and the management information T respectively followed by storing them respectively in the message body information storage unit and the message property information database unit, to store the entirety of the message in the message body storage unit and thereafter extract only the message property information except for the management information T followed by storing it in the message property information database unit, or to extract the management information T, which is then stored in a storage unit which is exclusively provided for the management information T in the server.

Also, the communication between one message processing server and another message processing server is based upon cipher communication such as SSL (Secure Socket Layer). However, it is not inevitable to make use of a cryptograph in the communication protocol level but it is possible to make use of another cryptograph implementation unless the contents as communicated can not be easily decrypted by a third person.

In the case of the embodiment in which individual users exchange messages with each other, only a single addressee receives the message. However, the operation is applicable also in the case where there are a plurality of addressees as involved.

Furthermore, the above respective embodiments are described so that messages are exchanged between the user terminal and the message processing server through a communication network. However, there are equivalent effects in the case where messages are inputted to and outputted from the message processing server by the use of an input/output device which is connected direct to the message processing server.

Meanwhile, in accordance with the management method as described above, while the message body is stored in the message storage region, the message property information relating to the message body is distributed to all the users as the addressees. The message storage region can be not only used to store messages but also used to store files and application software which are open to or shared with other users in place of or in addition to the message body.

By this configuration, it is possible to exchange and share files and therefore to prevent a file from being redundantly copied or redundantly transmitted to lessen the load on the system. Also, it becomes easy to update information such as version upgrade of files and application software. Since all the users always make use of the same file and application software, it is possible to avoid mismatch due to different versions and to update information such as re-scheduling in synchronism.

PRACTICAL INDUSTRIAL APPLICABILITY

In accordance with the message transmission and reception controlling method and the message transmission and reception controlling system of the present invention, each user can certainly control the situation of the reception and transmission while generating, from the message as transmitted to the message processing server from a user, the message body thereof, the message property information of the addressee and the message property information of the sender relating to the message, and browsing the message property information.

Then, by referring to the message property information, it is possible, at the sending end, to confirm whether or not the message as transmitted therefrom has been received and, if received, the date and time when received, while at the receiving end, it is possible to perform reception operation by browsing the message property information addressed thereto in order to receive the message as defined in the message property information so that the message can be received with any terminal at any time to prevent messages from being scattered over a plurality of terminals.

Also, since the message body shall not be transferred to another message processing server from the message body information storage unit of the message processing server having the user account of the sender, the confidentiality of the message is secured while messages are certainly controlled without a fear of losing the message due to some trouble during transmission unlike in the case of e-mail.

Furthermore, by providing the message property information with user permission information about the permission of reading, writing, deletion, transfer and the like relating to messages, the message body can not be manipulated by any operation request other than such operation requests by users who are permitted to perform operations in the user permission information of the message property information and therefore it is possible to improve reliability against invasion and attacks to the message processing server.

Meanwhile, since the property information required for accessing the message body and the management information required for controlling the message body, e.g., whether or not the message has been received and the date and time when received and the like are extracted from all the message property information, followed by storing the property information as extracted in the message property information database unit and storing the management information together with the message body, only the property information required for accessing the message body is stored in the message property information database unit of the addressee while the message body and the management information required for controlling the message body are stored in the message processing server of the sender and therefore, unlike the case where the management information is included in the property information, without generating data mismatch relating to the management information and the like due to update trouble between the destination and the sender. In addition to this, since only minimum information is receive/transmitted, it is possible to lessen the load on the message processing server in processing the reception and transmission operation.

Also, for information management business such as internet providers by making use of the message transmission and reception controlling system in accordance with the present invention, the message body is saved after encrypting the message body while the decryption key is stored in the message property information corresponding to the message so that even if the message processing server is invaded or attacked the message body and the message body is maintained as being secured without fear of decrypting unless the decryption key is browsed by the invading person.

Furthermore, it is possible to apparently exchange and share data without actual data transfer by making use of the message storage region for storing files and application software which are desirably open to or shared with other users in place of or in addition to the message body, and therefore to prevent a file from being redundantly copied or redundantly transmitted to lessen the load on the system and also to avoid mismatch due to different versions and to update information such as re-scheduling in synchronism while all the users always make use of the same file and application software.

Furthermore, while the system can coexist with the e-mail system which is a mainstream at the present day, even if an e-mail is transmitted from an e-mail user, it is possible to conduct the reception and transmission of the e-mail by the same procedure as in the case of the reception and transmission of messages from a user under control of the message processing server and therefore it is possible for information management business such as internet providers to smoothly meet with arrangement required for switch the system.

What is claimed is:

1. A message transmission and reception controlling system for controlling transmission and reception of messages among account users of this system through a communication network comprising a message processing server and a plurality of user terminals which are used by the account users, said message processing server comprising:

a message property information database unit operable to store the sender, destination addresses, transmission time, reception time, and title of each message, and information about whether or not the message body of each message has been received by a plurality of receiving account users;

a message body information storage unit operable to store the message body of each message;

a messages process controlling unit operable to
receive a message which is transmitted from a sending account user through the communication network and to be transmitted to the receiving account users,
divide the message into a message body and message property information,
store the message body in the message body information storage unit and the message property information in the message property information database unit,
transmit the message property information of the message addressed to each of the plurality of receiving account users,
receive a request from at least one of the receiving account users for transmission of the message body of the message which is selected by the receiving account user from among the messages addressed to this receiving account user with reference to the message property information of the message,
transmit the message body of the selected message to the at least one receiving account user together with the information about whether the message body has been received by other receiving account users,
transmit the information about whether or not each of the receiving account users has received the message body to the sending account user, and
update the message property information database unit in accordance with the transmission of the message body;

an e-mail process server connected to the messages process controlling unit, operable to receive a message which is transmitted from a sending account user and addressed to a receiving e-mail user through the messages process controlling unit and send this message to the receiving e-mail user as an e-mail message, and operable to receive an e-mail message from a sending e-mail user and addressed to a receiving account user and transmit the e-mail message to the receiving account user through the messages process controlling unit, each terminal of the plurality of user terminals comprising: a personal computer configured to display a reception screen containing the titles of a plurality of messages, and a message display screen containing a message body, wherein when one of the messages is selected in said reception screen by one of the receiving account users, the user terminal of said one receiving account user sends a request for transmission of the message body of the selected message to said message processing server, wherein when the message body of the selected message is received by the user terminal of said one receiving account user, the message body is displayed in the message display screen along with a listing of other receiving account users other than said one receiving account user, wherein the listing includes the information about whether or not each of the other receiving account users has received the message body respectively and, if received, when the message was received by each of the other receiving account users.

2. The message transmission and reception controlling system as claimed in claim 1 wherein at least one of said message body and the message property information is encrypted, and wherein a decryption key is stored in the terminal of the account users of the message transmission and reception controlling system and the messages process controlling unit.

3. The message transmission and reception controlling system as claimed in claim 2 wherein said message property information includes user permission information about the permission of reading, writing, deletion and transfer operations relating to the message, and said messages process controlling unit prevents the message body from being manipulated by a user with respect to an unauthorized operation in accordance with the user permission information.

* * * * *